United States Patent
Dannoux et al.

(10) Patent No.: US 9,284,212 B2
(45) Date of Patent: Mar. 15, 2016

(54) METHOD AND APPARATUS FOR BENDING A SHEET OF MATERIAL INTO A SHAPED ARTICLE

(75) Inventors: Thierry Luc Alain Dannoux, Avon (FR); Arnaud Dejean, Vaux le Penil (FR); Allan Mark Fredholm, Vulaines sur Seine (FR); Patrick Jean Pierre Herve, Avon (FR); Laurent Joubaud, Paris (FR); Sophie Peschiera, Veneux les Sablons (FR); Stephane Poissy, Brunoy (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 13/302,330

(22) Filed: Nov. 22, 2011

(65) Prior Publication Data

US 2012/0131961 A1    May 31, 2012

(30) Foreign Application Priority Data

Nov. 30, 2010   (EP) .................................... 10306317

(51) Int. Cl.
*C03B 23/025*   (2006.01)
*C03B 23/023*   (2006.01)
*C03B 23/035*   (2006.01)

(52) U.S. Cl.
CPC ......... *C03B 23/0235* (2013.01); *C03B 23/0252* (2013.01); *C03B 23/0256* (2013.01); *C03B 23/0258* (2013.01); *C03B 23/0357* (2013.01)

(58) Field of Classification Search
CPC ............ C03B 23/0235; C03B 23/0256; C03B 23/0258; C03B 23/027; C03B 23/0307
USPC .................... 65/103, 105, 106, 273, 107
See application file for complete search history.

(56) References Cited

U.S. PATENT DOCUMENTS

| 4,081,263 A |   | 3/1978 | Mestre et al. |
| 4,156,626 A | * | 5/1979 | Souder ....................... 156/273.3 |
| 4,229,201 A | * | 10/1980 | Comperatore et al. ......... 65/287 |
| 5,093,177 A |   | 3/1992 | Anderson et al. |

(Continued)

FOREIGN PATENT DOCUMENTS

| CN | 1121052 A | 4/1964 |
| CN | 1339412 A | 3/2002 |

(Continued)

OTHER PUBLICATIONS

Hans Bach and Dieter Krause, "Low Thermal Expansion Glass Ceramics", 2005, Springer, 2nd Edition, p. 89.*

(Continued)

*Primary Examiner* — Angela Ortiz
*Assistant Examiner* — Cynthia Szewczyk
(74) *Attorney, Agent, or Firm* — John T. Haran

(57) ABSTRACT

A method for bending a sheet of material into a shaped article includes providing the sheet of material. A reformable area and a non-reformable area of the sheet of material are heated to a first temperature range corresponding to a first viscosity range. The reformable area of the sheet of material is subsequently heated to a second temperature range corresponding to a second viscosity range. The reformable area of the sheet of material is reformed into a selected shape by at least one of sagging the reformable area of the sheet of material and applying a force to the sheet of material outside of or near a boundary of the reformable area.

16 Claims, 6 Drawing Sheets

(56) References Cited

U.S. PATENT DOCUMENTS

| | | | | |
|---|---|---|---|---|
| 5,656,052 | A | * | 8/1997 | Boardman et al. ............... 65/103 |
| 5,702,496 | A | * | 12/1997 | Tomozane et al. ............... 65/102 |
| 2002/0020192 | A1 | * | 2/2002 | Bader et al. ..................... 65/33.1 |
| 2003/0061835 | A1 | * | 4/2003 | Yoda et al. ....................... 65/114 |
| 2009/0277224 | A1 | * | 11/2009 | Angel et al. .................... 65/60.1 |
| 2010/0129602 | A1 | * | 5/2010 | Dejneka ........................ 428/130 |

FOREIGN PATENT DOCUMENTS

| | | |
|---|---|---|
| DE | 102006035555 A1 | 1/2008 |
| EP | 0445672 A1 | 9/1991 |
| JP | 54014416 | 2/1979 |
| JP | 58185444 | 10/1983 |
| JP | 62212237 | 9/1987 |
| JP | 63021229 | 1/1988 |
| JP | 06051249 | 7/1994 |
| JP | 2003502257 | 1/2003 |
| JP | 2010168252 | 8/2010 |
| JP | 2010228998 | 10/2010 |

OTHER PUBLICATIONS

U.S. Appl. No. 11/888,213, filed Jul. 31, 2007 titled Down-Drawable, Chemically Strengthened Glass for Cover Plate.

U.S. Appl. No. 12/277,573, filed Nov. 25, 2008 titled Glasses Having Improved Toughness and Scratch Resistance.

U.S. Appl. No. 12/392,577, filed Feb. 25, 2009 titled Fining Agents for Silicate Glasses.

U.S. Appl. No. 12/393,241, filed Feb. 26, 2009 titled Ion-Exchanged, Fast Cooled Glasses.

U.S. Appl. No. 12/537,393, filed Aug. 7, 2009 titled Strengthened Glass Articles and Methods of Making.

PCT/US2011/062218 Search Report.

English Translation of Notification of Reasons for Rejection, JP Application No. 2013-542072, Japanese Office Action, mailed Aug. 11, 2015, 4 pages.

China Search Report, Application No. 201180057697.0, Mar. 23, 2015, 3 pages.

English Translation of Second Office Action and Search Report for Chinese Application No. 201180057697.0, dated Nov. 25, 2015, 9 pages.

* cited by examiner

METHOD AND APPARATUS FOR BENDING A SHEET OF MATERIAL INTO A SHAPED ARTICLE

CROSS-REFERENCE TO RELATED APPLICATIONS

This application claims the benefit of priority under 35 U.S.C. §119 of European Patent Application Serial No. 10306317.8 filed on Nov. 30, 2010 the content of which is relied upon and incorporated herein by reference in its entirety.

TECHNICAL FIELD

The invention relates generally to methods and apparatus for reforming flat sheets into shaped articles.

BACKGROUND

There is a growing interest in the electronic display industry for high-quality, thin, shaped glass sheets, in particular, ones having a combination of flat areas and bent areas. For example, such shaped glass sheets are being demanded for use as covers of flat-screen televisions and for use as protective covers in other applications.

A flat glass sheet may be reformed into a shaped glass sheet. Various techniques for reforming flat glass sheets into shaped glass sheets are known, particularly in the context of automotive applications, e.g., windshields and side windows, and architectural applications, e.g., curved glass for architectural and commercial non-electronic displays. For example, U.S. Pat. No. 5,093,177 (Anderson et al.; 3 Mar. 1992) discloses a method of making a shaped glass sheet by pressing a recess area into a flat glass sheet, the shaped glass sheet being intended for use as a vehicle window. In the method of Anderson et al., a heater directs concentrated high temperature heat on a surface of the flat glass sheet to rapidly heat a transition section of a reform area of the flat glass sheet to its heat softening temperature. To avoid glass fracturing due to heating along a narrow band of the glass with concentrated heat, the glass sheet is preheated to an elevated temperature prior to applying the concentrated heat. After heating the transition section to its softening temperature, the reform area is positioned between and aligned with press dies. The reform area is then offset out of plane with the flat glass sheet by advancing one of the dies towards the other of the dies and pressing the reform area between the dies.

The method disclosed in Anderson et al. involves significant three-dimensional deformation in the reform area and pressing means to offset the reform area from the plane of the flat glass sheet. Such a process requires significantly decreased viscosity and a significant applied pressing force in the reform area. It is obvious to one skilled in the art that the surface state of the glass will be locally damaged under these conditions. For Anderson et al., this is not an issue since the "damaged part" will only have a mechanical role and will be hidden from observation of the fully mounted product. Such a luxury cannot be afforded in the case of a shaped glass sheet intended for use as a cover of an electronic display.

SUMMARY

In one aspect of the invention, a method for bending a sheet of material into a shaped article comprises providing the sheet of material (step a), heating a reformable area and a non-reformable area of the sheet of material to a first temperature range corresponding to a first viscosity range (step b), subsequently heating the reformable area of the sheet of material to a second temperature range corresponding to a second viscosity range (step c), and reforming the reformable area of the sheet of material into a selected shaped by at least one of sagging the reformable area of the sheet of material and applying a force to the sheet of material outside of or near a boundary of the reformable area (step d).

In one embodiment of the method, in step c, a ratio of a total area of the sheet of material heated to the second temperature range to the reformable area heated to the second temperature range is less than or equal to 1.5, wherein the total area overlaps the reformable area.

In one embodiment of the method, in step c, a ratio of a total area of the sheet of material heated to the second temperature range to the reformable area heated to the second temperature range is less than or equal to 1.2, wherein the total area overlaps the reformable area.

In one embodiment of the method, the sheet of material provided in step a has a thickness in a range from 0.3 mm to 1.5 mm.

In one embodiment of the method, the sheet of material has a coefficient of thermal expansion greater than 5 ppm $K^{-1}$.

In one embodiment of the method, a lower limit of the first viscosity range is greater than an upper limit of the second viscosity range.

In one embodiment of the method, the lower limit of the first viscosity range is greater than $6 \times 10^9$ Poise.

In one embodiment of the method, the second viscosity range is from $10^8$ Poise to $10^9$ Poise.

In one embodiment of the method, step d comprises applying vacuum to the reformable area to assist sagging of the reformable area.

In one embodiment of the method, step c comprises focusing radiant heat onto the reformable area using an optical element.

In one embodiment of the method, step c comprises focusing radiant heat onto the reformable area using a shield element.

In one embodiment of the method, the reformable area and the non-reformable area of the sheet of material are contiguous.

In one embodiment of the method, the sheet of material in step a is flat, and after step d, the non-reformable area remains flat.

In one embodiment of the method, the selected shape includes a bend.

In another aspect of the invention, an apparatus arrangement for bending a sheet of material into a shaped article comprises a support for holding the sheet of material and a heating arrangement for locally heating a reformable area of the sheet of material to a selected temperature corresponding to a selected viscosity range while the sheet of material is held on the support. The heating arrangement comprises a heat source and an optical element or shield element for focusing heat from the heat source onto the reformable area of the sheet of material.

In one embodiment of the apparatus arrangement, the optical element comprises an elliptical mirror for reflecting the heat onto the reformable area of the sheet of material.

In one embodiment of the apparatus arrangement, the shield element comprises a heat-resistant shield having an aperture for focusing the heat onto the reformable area of the sheet of material.

In one embodiment of the apparatus arrangement, the heat source is a resistive-type heater.

It is to be understood that both the foregoing summary and the following detailed description are exemplary of the invention and are intended to provide an overview or framework for understanding the nature and character of the invention as it is claimed in this specification. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages of the invention will be set forth below and, in part, will be readily apparent to those skilled in the art from the description in this specification or recognized by practicing the invention as described in this specification.

In one embodiment, a method of making a shaped article comprises providing a sheet of material, the material having a visco-elastic property. In one embodiment, the material is a glass-containing material, such as glass or glass-ceramic. In one embodiment, the sheet of material is thin, e.g., having a thickness in a range from 0.3 mm to 1.5 mm. In one embodiment, the sheet of material has a coefficient of thermal expansion greater than 5 ppm $K^{-1}$. Various types of glasses having the specified thickness and coefficient of thermal expansion may be used in one embodiment. An example of a suitable glass is GORILLA glass, which is available from Corning Incorporated, NY, under code 2317. In some embodiments, it is desired that the suitable glass is an ion-exchangeable alkali-containing glass. The ion-exchangeable alkali-containing glass has a structure that contains small alkali ions, such as Li+, Na+, or both. These small alkali ions can be exchanged for larger alkali ions, such as K+, during an ion-exchange process. Examples of suitable ion-exchangeable alkali-containing glasses are alkali-aluminosilicate glasses such as described in U.S. patent application Ser. Nos. 11/888,213, 12/277,573, 12/392,577, 12/393,241, and 12/537,393, all assigned to Corning Incorporated, the contents of which are incorporated herein by reference in their entirety. These alkali-aluminosilicate glasses can be ion-exchanged at relatively low temperatures and to a depth of at least 30 μm. The previously mentioned GORILLA glass is a commercial example of an ion-exchangeable alkali-containing glass.

Figure 1A:
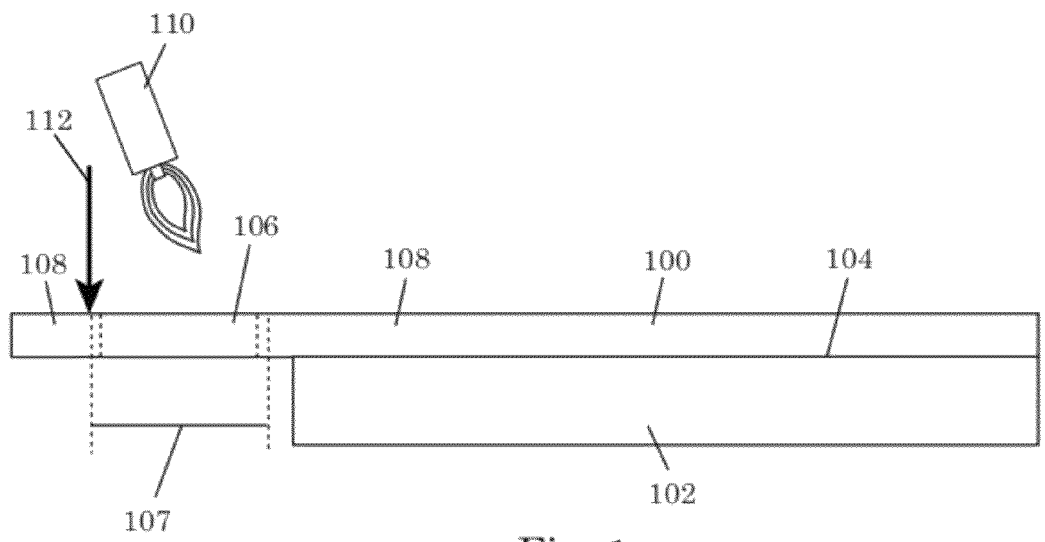
FIG. 1a is a schematic of localized heating of a reformable area of a sheet of material.

In one embodiment, the sheet of material is provided in a flat form. For a sheet of glass-containing material, any suitable method for producing flat glass, such as overflow fusion downdraw process or float process, may be used. In FIG. 1a, the sheet of material 100 is placed on a support 102. In the embodiment of FIG. 1a, the support 102 has a planar surface 104 on which the sheet of material 100 is supported. The sheet of material 100 is placed on the support 102 such that a portion of the sheet of material 100 overhangs or is cantilevered from the support 102. The sheet of material 100 has at least one "reformable area" 106 and at least one "non-reformable area" 108. The reformable area is the area of the sheet of material that will be formed into a three-dimensional shape. Typically, the three-dimensional shape will include a bend having a certain radius of curvature. The non-reformable area is the remaining area of the sheet of material that will not be formed into a three-dimensional shape. In general, the reformable area(s) will be contiguous with the non-reformable area(s).

In the embodiment shown in FIG. 1a, the reformable area 106 overhangs the support 102 and does not make contact with the support 102. However, other arrangements of the reformable area 106 relative to the support 102 are possible. For example, in the embodiment shown in FIG. 1b, the reformable area 106 overlaps a portion 102a of the support 102b. The portion 102a is rounded so that there is no substantial contact between the reformable area 106 and the surface of the portion 102a before the reformable area 106 is formed into a three-dimensional shape. When the reformable area 106 is formed into a three-dimensional shape, there may be contact between the reformable area 106 and the surface of the portion 102a. In this case, the material of the surface 103 of the portion 102a may be suitably selected to avoid stickiness between the reformable area 106 and the portion 102a of the support 102b at elevated temperatures. In addition to the embodiments shown in FIGS. 1a and 1b, the reformable area 106 could be located anywhere on the sheet of material 100 as demanded by the shaped article to be formed.

Figure 1B:
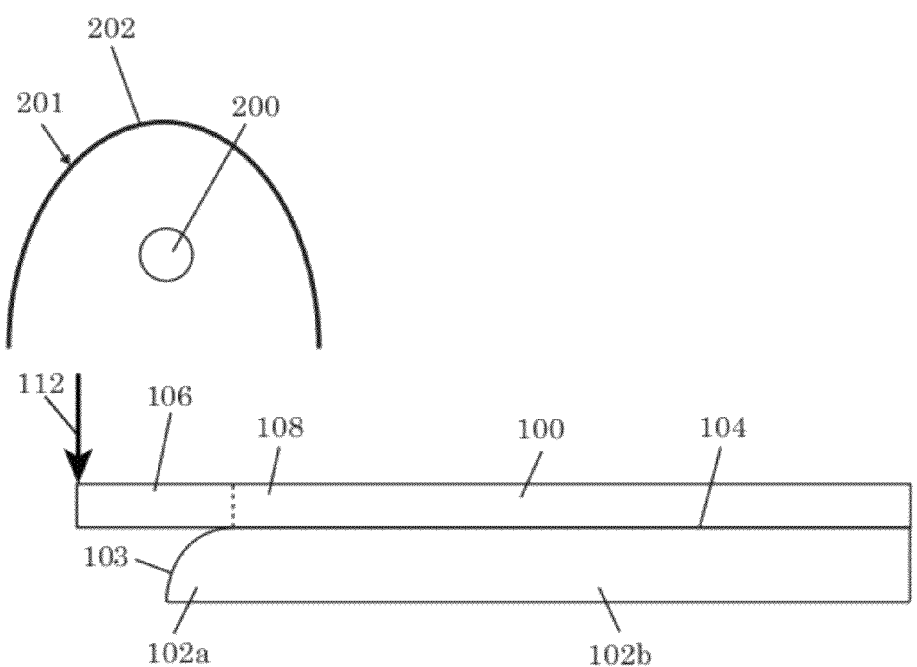
FIG. 1b is a schematic of localized heating of a reformable area of a sheet of material.
Figure 1C:
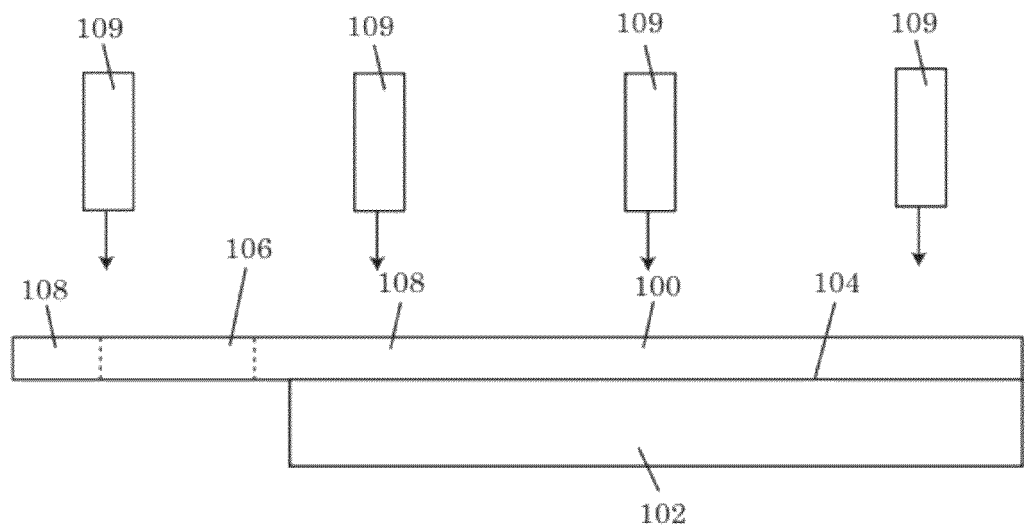
FIG. 1c is a schematic of generalized heating of a sheet of material.

While the sheet of material 100 is on the support 102, both the reformable area(s) 106 and the non-reformable area(s) 108, i.e., the entire sheet of material, are heated to a first temperature range corresponding to a first viscosity range, as shown in FIG. 1c. In FIG. 1c, the heaters 109 are used in generalized or overall heating of the sheet of material 100. Various types of heaters 109 may be used, such as gas burners, resistive-type filaments, and plasma torches. For a sheet of glass-containing material 100, the first temperature range is low enough to avoid deformation of or optical quality defects in the sheet of material but high enough to avoid breakage of the sheet of material material due to dilatation mismatch when subsequent localized heating is applied to the reformable area 106. In one embodiment, the first viscosity range is greater than $6 \times 10^9$ Poise. The upper limit of the first viscosity range may be $10^{12}$ Poise.

After heating the sheet of material 100 to the first temperature range, the reformable area 106 is locally heated to a second temperature range corresponding to a second viscosity range. In one embodiment, the upper limit of the second viscosity range is lower than the lower limit of the first viscosity range. The following additional description is based on the assumption that the sheet of material 100 is a sheet glass-containing material. In one embodiment, the upper limit of the second viscosity range is $10^9$ Poise. In one embodiment, the second viscosity range is from $10^8$ Poise to $10^9$ Poise. In one embodiment, the second temperature range is at the forming temperature of the glass-containing material, preferably below the softening point of the glass-containing material, and more preferably between the softening point and the annealing point of the glass-containing material. In one embodiment, the second temperature range is at least 10° C. below the softening point of the glass-containing material.

While the reformable area 106 is at the second viscosity range, the following occurs: (i) the reformable area 106 is reformed into a three-dimensional shape, (ii) the non-reformable area 108 remains substantially at the first viscosity range, and (iii) the non-reformable area 108 remains substantially flat. Reforming can involve simply allowing the reformable area 106 to sag due to gravity. Reforming can involve assisting sagging of the reformable area 106 with vacuum, i.e., by applying vacuum to the reformable area 106 either before the reformable area 106 starts to sag or while the reformable area 106 is sagging. Reforming can involve applying a force to the sheet of material 100 in an area of the sheet of material 100 either outside of the reformable area 106, as illustrated at 112 in FIG. 1*a*, FIG. 2, and FIG. 3, or near the boundary of the reformable area 106, as illustrated at 112 in FIG. 1*b*. Applying the force "near" the boundary includes the possibility of applying the force "at" the boundary. In general, it is desirable to avoid contacting the reformable area 106 (or the quality area of the reformable area 106) with an object that might produce defects in the reformable area 106, particularly while the reformable area 106 is in the second temperature range.

While heating the reformable area 106 to the second temperature range it is quite possible that the heat applied to the reformable area 106 may extend beyond the reformable area 106. In this case, it is desirable to limit how much the heat may extend beyond the reformable area 106. In one embodiment, the ratio of the total area (e.g., 107 in FIG. 1*a*) of the sheet of material 100 heated to the second temperature to the reformable area 106 is not greater than 1.5, where the total area overlaps the reformable area. In another embodiment, the ratio of the total area (e.g., 107 in FIG. 1*a*) of the sheet of material 100 heated to the second temperature to the reform area 106 is not greater than 1.2, where the total overlaps the reformable area. To limit how much heat extends beyond the reformable area 106, the heat applied to the reformable area 106 is preferably focused. Two heating arrangements for achieving this focused heating will be described below.

In one embodiment, convective heating is used to achieve localized heating of the reformable area 106. In one embodiment, as illustrated in FIG. 1*a*, the convective heating is achieved by using a gas burner 110 to direct heat onto the reformable area 106. Because of convective heating, the gas burner 110 can impose a high localized heating rate to the reformable area 106. Premixed gas based on the combination of two chemical species can be supplied to the gas burner. Examples of combinations of gaseous chemical species include, but are not limited to, hydrogen and oxygen, methane and oxygen, and methane and air. In another embodiment, the convective heating is achieved by directing heated gas on the reformable area 106. The heated gas may or may not be a combination of gaseous chemical species.

Figure 2:
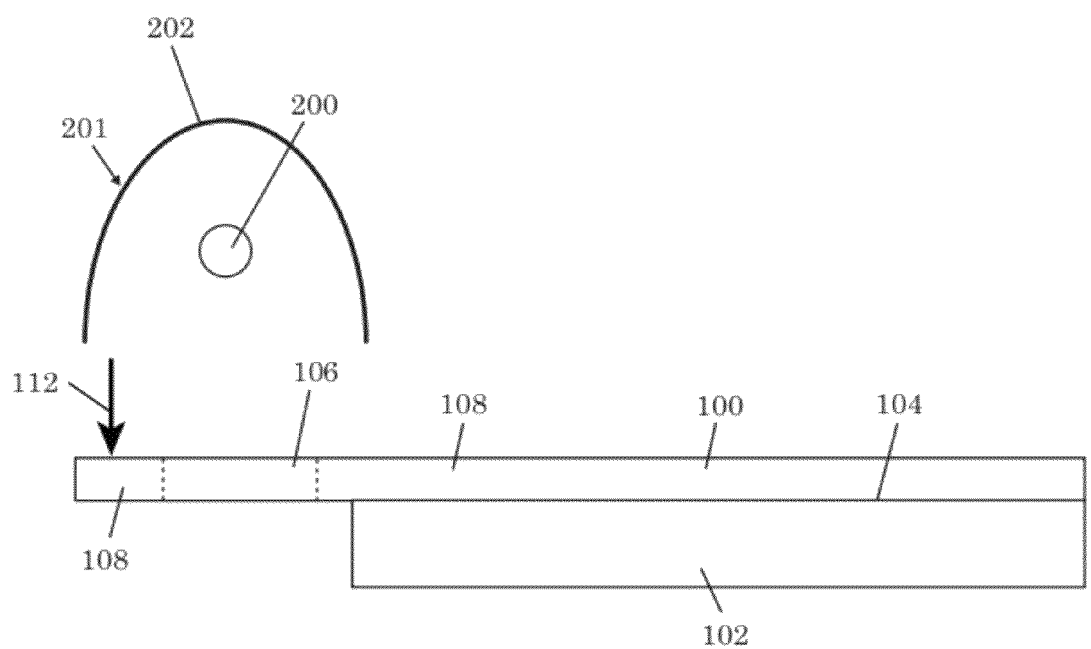
FIG. 2 is a schematic of a heating arrangement for localized heating of a reformable area of a sheet of material.

In one embodiment, radiative heating is used to achieve localized heating of the reformable area 106. FIGS. 1*b* and 2 illustrate a focused radiative heating arrangement 201. In FIGS. 1*b* and 2, a resistance-type heater 200 is located above the reformable area 106 for heating of the reformable area 106. To collect a maximum of the radiative energy produced by the resistance-type heater 200, one or more optical elements, such as a high-temperature elliptical mirror 202, i.e., a mirror having an elliptical shape and made of a high-temperature material, are used to focus the radiative energy generated by the resistance-type heater 200 onto the reformable area 106. The mirror 202 has two focuses. One focus is located at the position of the resistance-type heater 200, and the other focus is located on, or close to the surface of, the reformable area 106. The radiative energy received by the mirror 202 from the resistance-type heater 200 is reflected and focused at the center of the reformable area 106. In order to obtain good reflection properties, various materials presenting a low emissivity at high temperatures can be used for the mirror 202. Examples include, but are not limited to, platinum or platinum-coated refractory alloys.

Figure 3:
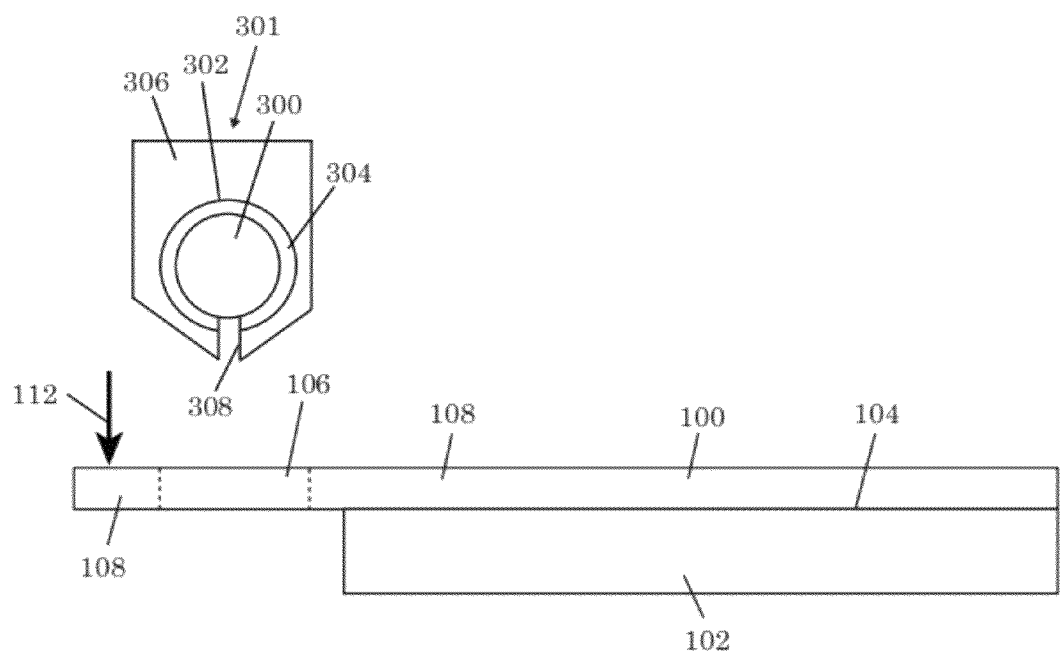
FIG. 3 is a schematic of a resistive heating arrangement for localized heating of a reformable area of a sheet of material.

FIG. 3 illustrates a focused radiative heating arrangement 301. A resistance-type heater 300 is enclosed in an insulated chamber 302 (the insulating material is shown at 304) of a high-temperature or heat-resistant shield 306. The shield 306 in one embodiment is made of a metallic or ceramic refractory material. Heat from the resistance-type heater 300 is directed to the reformable area 106 through an aperture 308 in the heating shield 306 that is located above the reformable area 106. The shape of the aperture 308 may be selected to match the shape of the reformable area 106. For example, if the reformable area 106 is in the form of a rectangle, the aperture 308 may also be in the form of rectangle. It may also be possible to use the shield concept with the convective heating described above, i.e., where the heat from the burner or the heated gas is directed to the reformable area 106 through an aperture in an appropriate high-temperature or heat-resistant shield.

The resistive-type heaters 200, 300 in FIGS. 2, 3 may be mid-infrared heaters, such as Hereaus Noblelight mid-IR heaters, which have a fast response and resistive elements that are enclosed in a quartz glass envelope, which would protect the sheet of material from contaminants from the resistive elements.

Figure 4:
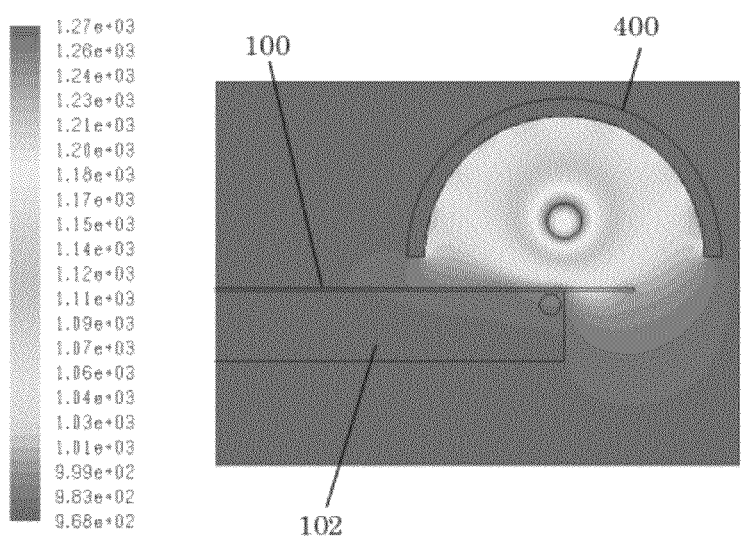
FIG. 4 is a plot of temperature distribution of a focused radiant heating.
Figure 5:
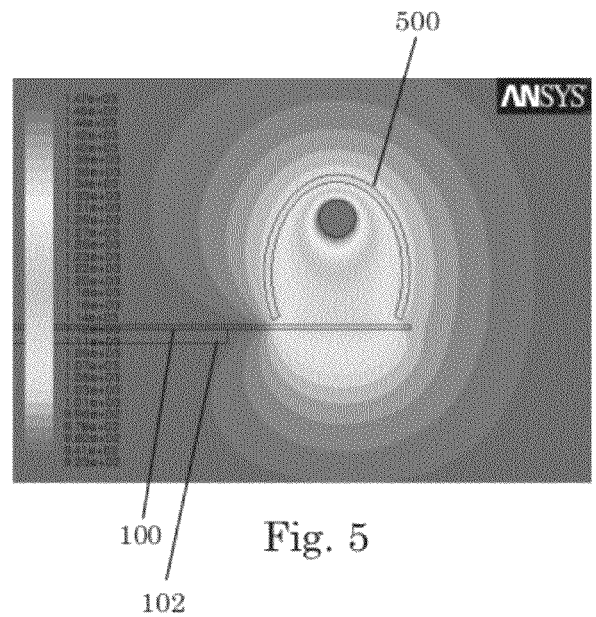
FIG. 5 is a plot of temperature distribution of a focused radiant heating.
Figure 6:
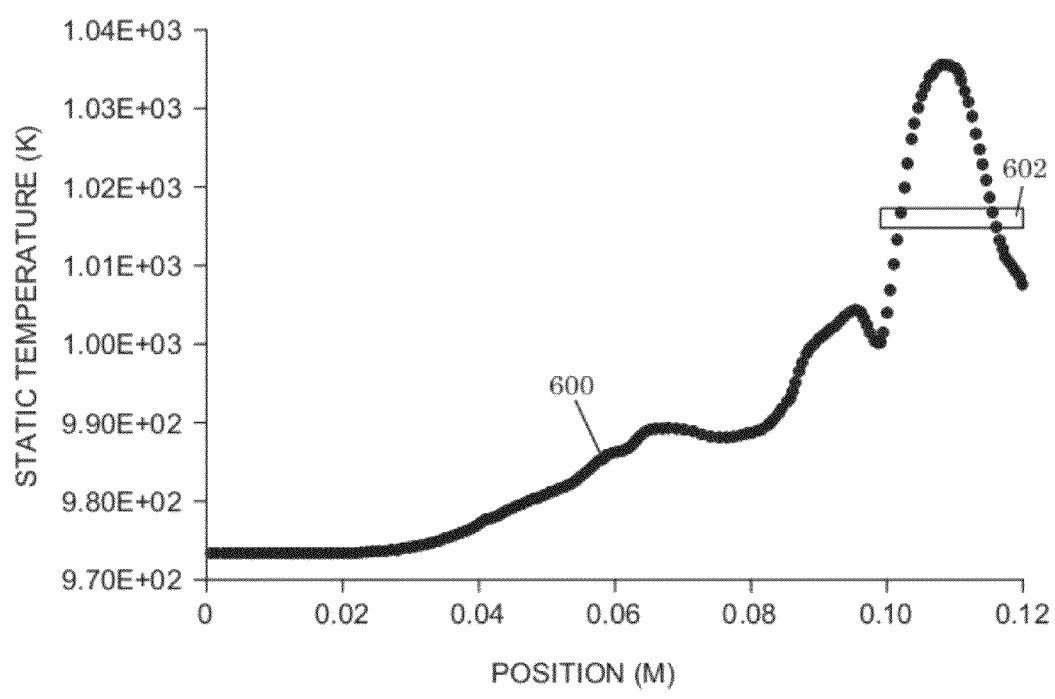
FIG. 6 is a graph showing a thermal profile of a sheet of material after localized heating of the reformable area of the sheet of material using the focused radiant heating arrangement of FIG. 2.
Figure 7:
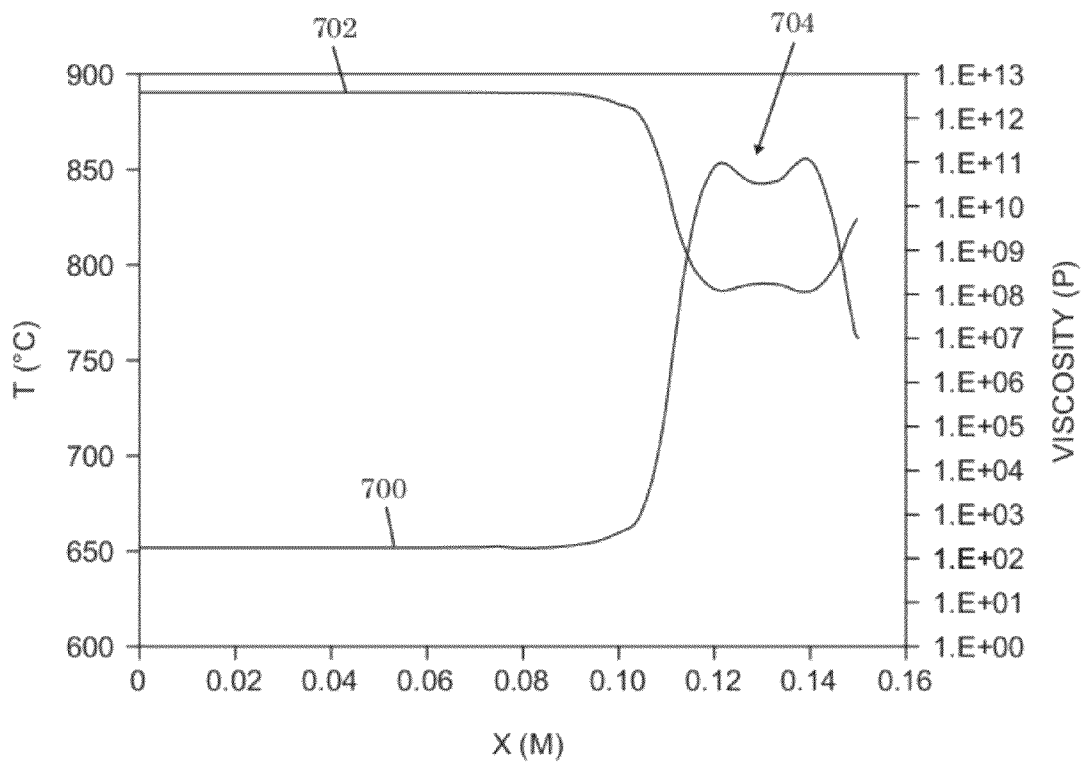
FIG. 7 is a graph showing a thermal profile and viscosity profile of a sheet of material after localized heating of a reformable area of the sheet of material using the focused radiant heating arrangement of FIG. 2.

FIGS. 4 and 5 show examples of temperature distributions obtained by focused radiative heating arrangements (similar to the one shown in FIGS. 1*b* and 2 at 201) after 30 seconds of radiant heating with two different elliptical mirrors 400, 500 at 4 kW/m. FIG. 6 shows a thermal profile 600 of a sheet of glass-containing material after heating of the reformable area of the sheet for 30 seconds using the radiant heating arrangement of FIG. 4. The portion of thermal profile 600 corresponding to the reformable area is indicated by box 602. FIG. 7 shows a thermal profile 700 of a sheet of glass-containing material and corresponding viscosity profile 702 along the surface of the sheet of glass-containing material after heating the reformable area to the second viscosity range. The portion of the profiles 700, 702 corresponding to the reformable area is indicated generally at 704.

The material of the support (102 in FIGS. 1*a*, 1*b*, 1*c*, 2, and 3) should be able to withstand the temperatures to which the sheet of material 100 will be heated and also should not stick to the sheet of material at these temperatures. In a first instance where the reformable area 106 will not contact the support 102, such as shown in FIGS. 1a, 1c, 2, and 3, the material of the support need only be able to withstand elevated temperatures and avoid stickiness in the first temperature range. As such, there is a wider range of materials that could be used for the support 102 in this first instance. Examples of materials for the support 102 in this first instance include, but are not limited to, stainless steel, refractory alloys, and ceramic. In a second instance where the reformable area 106 may contact the support 102 (102b), such as shown in FIG. 1b, there is some restriction on the material for the support 102 (102b). The portion 102a of the support 102b that could make contact with the reformable area 106 should be able to withstand elevated temperatures and avoid stickiness in the second temperature range. In this second instance, the portion 102a may be made of a high-temperature material such as INCONEL 718 or stainless steel. Alternatively, to avoid having to construct the support 102b from materials with different thermal expansion behaviors, the surface of the portion 102a of the support 102b may be coated with a suitable high-temperature (non-stick) coating selected for use at the second temperature range.

After heating the reformable area 106 to the second temperature range corresponding to the second viscosity range, the reformable area 106 is locally reformed into a selected three-dimensional shape. There are a variety of methods of reforming the reformable area, as previously described. In the example shown in FIGS. 1a-3, a force is applied to the sheet of material, as shown at 112, to bend the sheet of material in the reformable area 106 by a selected angle. In FIG. 1b, the support 102b is rounded at the edge where it makes contact with the reformable area 106, as indicated at 103, to avoid forming a bend with a sharp inner surface in the reformable area 106 or so that the rounded edge 103 may control the bend in the reformable area 106.

Figure 8:
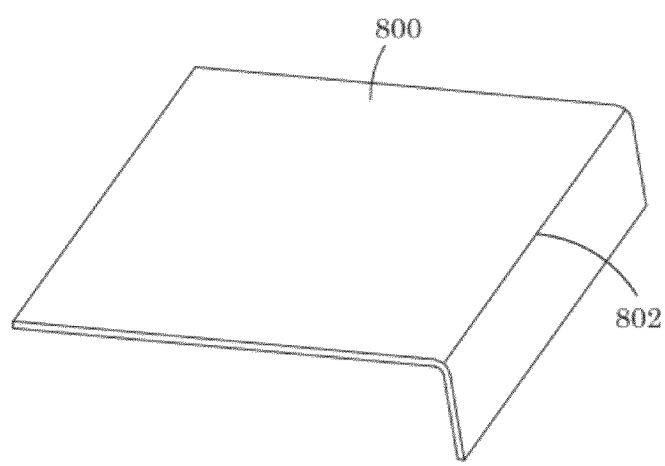
FIG. 8 is a perspective view of a shaped article with a 90° bend.
Figure 9:
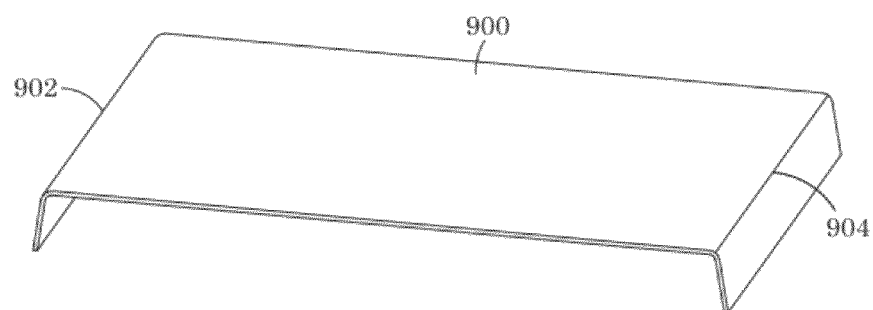
FIG. 9 is a perspective view of a shaped article with two 90° bends.
Figure 10:
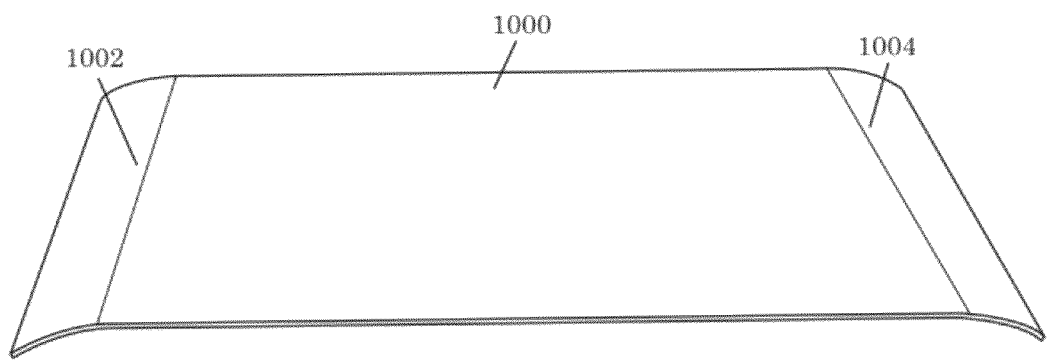
FIG. 10 is a perspective view of a shaped article with two 45° bends.

FIG. 8 shows a shaped article 800 formed by the method described above and using convective heating of FIG. 1a for localized heating of the reformable area (106). The shaped article has a 90° 2-mm radius bend 802 in the reformable area. FIG. 9 shows a shaped article 900 formed by the method described above and using the focused radiative heating arrangement of FIG. 2 for localized heating of the reformable area. The shaped article 900 has two 90° 5-mm radius bends 902, 904 in two reformable areas. FIG. 10 shows a shaped article 1000 formed by the method described above and using the focused radiative heating arrangement of FIG. 3 for localized heating of the reformable area. The shaped article has two 45° 30-mm radius bends 1002, 1004 in two reformable areas. In general, a bend having a bend angle in a range from 30° to 90° may be formed. (Using FIG. 1a for illustration purposes, the bend angle is measured relative to the horizontal. Thus, a bend angle of 90° would correspond to the reformable area 106 being essentially perpendicular to the support 102, and a bend angle of 0° (or no bend angle) would correspond to the reformable area 106 being essentially parallel to the support 102.)

After the reformable area 106 is shaped, the sheet of material 100 is allowed to cool down. For a glass-containing material, the sheet of material 100 is typically allowed to cool down to a temperature range at which the glass-containing material has a viscosity of approximately $10^{13}$ Poise or greater. The sheet of material containing the shaped reformable area will be referred to as a shaped article. The shaped article may be annealed. The edge(s) of the shaped article may be finished, trimmed or contoured, to achieve to a final size or shape. The shaped article may be subjected to an ion-exchange process. Typically, the ion-exchange process would involve immersing the shaped article into a molten bath comprising a salt of an alkali metal, where the alkali metal has an ionic radius that is larger than that of the alkali metal ions contained in the glass-containing material of the shaped article. The larger alkali metal ions in the molten bath will replace the smaller alkali metal ions in the glass-containing material of the shaped article, leading to a desirable compressive stress at or near the surface of the shaped article. After ion-exchange, the surface of the shaped article may be protected with an anti-smudge coating.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for bending a sheet of material into a shaped article, comprising:
   (a) placing a sheet of material having a reformable area and a nonreformable area on a support such that the reformable area does not make contact with the support and the nonreformable area does make contact with the support, the sheet of material being selected from the group consisting of a sheet of glass and a sheet of glass-ceramic;
   (b) heating the reformable area and the non-reformable area of the sheet of material to a first temperature range corresponding to a first viscosity range;
   (c) subsequently locally heating the reformable area of the sheet of material to a second temperature range corresponding to a second viscosity range; and
   (d) reforming the reformable area of the sheet of material into a selected shape by (i) sagging the reformable area of the sheet of material while the reformable area is at the second temperature range and (ii) avoiding contact of an object with the sheet of material within the reformable area while the reformable area is at the second temperature range,
   wherein the non-reformable area and the reformable area of the sheet of material are contiguous, wherein the sheet of material in step (a) is flat, and wherein after step (d), the non-reformable area remains flat.

2. A method according to claim 1, wherein in step (c), the heat applied to the reformable area does not extend beyond a local area of the sheet of material overlapping the reformable area, wherein a ratio of a total area of local area to the reformable area heated to the second temperature range is less than or equal to 1.5.

3. A method according to claim 1, wherein the sheet of material provided in step (a) has a thickness in a range from 0.3 mm to 1.5 mm.

4. A method according to claim 1, wherein the sheet of material has a coefficient of thermal expansion greater than 5 ppm $K^{-1}$.

5. A method according to claim 1, wherein a lower limit of the first viscosity range is greater than an upper limit of the second viscosity range.

6. The method of claim 5, wherein the lower limit of the first viscosity range is greater than $6 \times 10^9$ Poise.

7. The method of claim 5, wherein the second viscosity range is from $10^8$ poise to $10^9$ Poise.

8. A method according to claim 1, wherein step (d) comprises:
   (d1) applying vacuum to the reformable area to assist sagging of the reformable area.

9. A method according to claim 1, wherein step (c) comprises:
(c1) focusing radiant heat onto the reformable area using an optical element.

10. A method according to claim 1, wherein the selected shape includes a bend.

11. A method according to claim 1, wherein step (c) comprises:
(c2) focusing radiant heat onto the reformable area using a shield element.

12. A method for bending a sheet of material into a shaped article, comprising:
(a) placing a sheet of material having a reformable area and a nonreformable area on a support such that the reformable area does not make contact with the support and the nonreformable area does make contact with the support, the sheet of material being selected from the group consisting of a sheet of glass and a sheet of glass-ceramic;
(b) heating the reformable area and the non-reformable area of the sheet of material to a first temperature range corresponding to a first viscosity range;
(c) subsequently locally heating the reformable area of the sheet of material to a second temperature range corresponding to a second viscosity range; and
(d) reforming the reformable area of the sheet of material into a selected shape by (i) applying a force to the sheet of material outside of or near a boundary of the reformable area not in contact with the support while the reformable area is at the second temperature range and (ii) avoiding contact of an object with the sheet of material within the reformable area while the reformable area is at the second temperature range.

13. A method according to claim 12, wherein in step (c), the heat applied to the reformable area does not extend beyond a local area of the sheet of material overlapping the reformable area, wherein a ratio of a total area of local area to the reformable area heated to the second temperature range is less than or equal to 1.5.

14. A method according to claim 12, wherein the sheet of material provided in step (a) has a thickness in a range from 0.3 mm to 1.5 mm.

15. A method according to claim 12, wherein the sheet of material has a coefficient of thermal expansion greater than 5 ppm $K^{-1}$.

16. A method according to claim 12, wherein:
a lower limit of the first viscosity range is greater than an upper limit of the second viscosity range,
the lower limit of the first viscosity range is greater than $6 \times 10^9$ Poise, and
the second viscosity range is from $10^8$ poise to $10^9$ Poise.

* * * * *